3,511,598
PURIFICATION OF SODIUM ARSENITE SOLUTIONS
John T. Young, Long Branch, Calif., assignor to United States Borax & Chemical Corporation, Los Angeles, Calif., a corporation of Nevada
No Drawing. Filed Sept. 8, 1966, Ser. No. 577,830
Int. Cl. C01b 27/02
U.S. Cl. 23—53           12 Claims

ABSTRACT OF THE DISCLOSURE

An aqueous solution of an alkali metal arsenite which is substantially free of impurities and which will remain substantially clear and uncolored for extended periods of time is prepared by reacting crude arsenic trioxide with an alkali metal hydroxide and subsequently adding an alkali metal sulfide or bisulfide and heating to a temperature of from about 80° to 100° C., to precipitate undesirable impurities followed by separation of the precipitate from the arsenite solution. If desired improved purification may be obtained by also adding an alkaline earth metal oxide or hydroxide.

---

This invention relates to a method of preparing an alkali metal arsenite solution, method for purifying same and resulting solution. More particularly, this invention relates to a method of preparing a sodium arsenite solution, method for purifying same and resulting solution.

Primarily, this invention relates to a method of preparing an improved aqueous sodium arensite solution from arsenic trioxide and sodium hydroxide in an aqueous medium, the said improvement residing in the further purification steps so that the solution will not form a dark precipitate on standing but will remain relatively clear.

Ordinarily, when a solution of clear sodium arsenite is prepared, even if prepared from relatively so-called pure arsenic trioxide, the resulting solution becomes dark in color and/or a slight dark precipitate forms after standing for a relatively short period of time. This occurs even if the solution is filtered. Surprisingly, spectrographic analysis of crude and supposedly refined arsenic trioxide reveals as many as twenty-seven elements as possible contaminants which might produce solution discoloration or a precipitate. For instance, these elements have been determined to be aluminum, antimony, bismuth, boron, cadmium, cobalt, copper, chromium, iron, lead, magnesium, manganese, molybdenum, nickel, thallium, selenium, silicon, silver, strontium tellurium, tin, titanium, zinc, and vanadium.

Accordingly, the present invention contemplates the production of a relatively clear aqueous sodium arsenite solution by treating such solution with alkali metal sulfide or alkali metal bisulfide. The resultant is then heated for approximately two hours to form a precipitate or to coagulate the impurities. The solution is then filtered or centrifuged. Within the purview of the inventive concept is the treatment of the aqueous sodium arsenite solution as stated plus the further inclusion of alkaline earth metal hydroxide or alkaline earth metal oxide. It has been found that the latter combination technique is more efficacious.

Specifically, a sodium arsenite solution of the present invention is prepared by reacting a quantity of relatively crude arsenic trioxide with a quantity of sodium hydroxide. A solution prepared in this manner contains a small amount of dark insoluble material which will slowly settle upon standing for several hours at 80° C. This may be expected inasmuch as crude arsenic trioxide contains a number of impurities which form insoluble compounds, possibly hydroxides, in the presence of sodium hydroxide. Even when relatively refined arsenic trioxide is employed a slight dark precipitate forms after standing only a short period of time.

In order to maintain the sodium arsenite in a relatively clear condition, for a longer period of time than otherwise possible, the sodium arsenite solution is diluted with water to a desired specific gravity or percentage of $As_2O_3$. To this solution an aqueous solution of sodium sulfide is added accompanied with agitation and heating to maintain the temperature of the mixture from 80–100° C. In the preferred mode of carrying out the invention, calcium oxide is added to the mixture also accompanied by agitation and maintenance of the same temperature conditions. Heating and agitation is continued for approximately one hour or more. The resultant is then diluted with water to arrive at the desired sodium arsenite concentration. The resultant will have a quantity of precipitate which may be removed by filtering, with or without the use of conventional filter aids; or the resultant may be centrifuged.

The quantities of the ingredients may vary considerably, however, a guiding factor is the solubility of the arsenic trioxide, which, of course, increases with heat and increased alkalinity, that is, increased concentration of sodium hydroxide. The preferred ratio by weight of $As_2O_3$ to NaOH is 3.33:1. When the concentration of the $As_2O_3$ is 8 pounds per gallon the concentration of NaOH may range from 2.3–2.5 pounds per gallon. Similarly, the concentration of calcium oxide is .006–.012 pounds per gallon. The ratio of the arsenic trioxide to NaOH to sodium sulfide to calcium oxide may be represented as follows 8:2.3–2.5:.006–.012:.006–.012.

EXAMPLE

Arsenic trioxide—65,400 pounds
Sodium hydroxide (50% liquid)—3,000 gallons
Sodium sulfide—50 pounds
Calcium oxide—50 pounds
Water to make 8,000 gallons The above quantity of ingredients are sufficient to produce 8,000 gallons of sodium arsenite containing 8 pounds of arsenic trioxide per gallon of solution.

In carrying out the procedure, the sodium hydroxide solution is added to a large mixing tank to which 200 gallons of water are added. With continuous agitation, the arsenic trioxide in powdered form is gradually added to the sodium hydroxide solution. The mixture is heated to insure solubilization of the arsenic trioxide and to thereby further the production of sodium arsenite.

The 50 pounds of sodium sulfide is dissolved in a small quantity of water. This solution is added to the other ingredients accompanied with considerable agitation and further heating to between 80–100° C. for approximately one hour.

Calcium oxide is added to the resultant with agitation and continued maintenance of the 80–100° C. temperature. The mixture is agitated for approximately an hour.

Sufficient additional water is added to arrive at the 8 pounds of arsenic trioxide per gallon level. This may be determined by achieving a specific gravity of 1.960 at 20° C.

The resultant is filtered while hot with the utilization of conventional filter aids.

The resulting clear filtrate contains the following:

8 pounds of $As_2O_3$ per gallon
2.4 pounds of NaOH per gallon

Properties of the resulting solution:

Specific gravity—1.960 at 20° C.
Weight per gallon—16.35 pounds
Percentage active ingredient: Sodium arsenite 62.20%

(total arsenic as metallic all water soluble 35.89%)
Percentage inert ingredients: 37.80%

The exact mechanism of the reaction leading to the precipitation and/or coagulation of the impurities is not known. As a matter of fact, in regard to certain of the elements, it is somewhat surprising that a reaction occurs. In order to show clearly what is meant by this assertion a sodium arsenite solution is prepared to which various elements in compound form are added to the solution. In making up the sodium arsenite solution reagent grade $As_2O_3$ and C.P. sodium hydroxide is used. The concentration is 8 pounds $As_2O_3$ per gallon. The following table illustrates the addition of various elements and elucidates the fact that even though the sodium sulfide does not apparently react with the added ingredient in each instance some precipitation does occur.

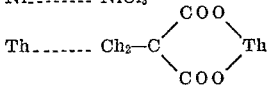

REACTIONS OF SODIUM ARSENITE SOLUTIONS CONTAINING IMPURITIES WITH SODIUM SULFIDE

While the foregoing purification steps have been undertaken on sodium arsenite solutions prepared by reacting $As_2O_3$ with NaOH, the present purification concepts are applicable in purifying sodium arsenite solutions prepared by different methods.

What is claimed is:
1. A process for the preparation of a clear solution of an alkali metal arsenite from impure arsenic trioxide containing at least one impurity from the group consisting of compounds of the elements, aluminum, antimony, bismuth, boron, cadmium, cobalt, copper, chromium, iron, lead, magnesium, manganese molybdenum, nickel, thallium, selenium, silicon, silver, strontium, tellurium, tin, titanium, zinc and vanadium, comprising reacting the impure arsenic trioxide with an alkali metal hydroxide in aqueous solution, to form the alkali metal arsenite, precipitating the impurities by adding an inorganic sulfide selected from the group consisting of sodium sulfide and sodium bisulfide, adding an alkaline earth metal compound selected from the group consisting of calcium hydroxide and calcium oxide, heating the reaction mixture to between 80° and 100° C., and separating the precipitated impurities from the arsenite solution, said purified solution remaining clear for a period of time greater than when the impurities are present.

2. The process of claim 1 wherein the alkali metal hydroxide is sodium hydroxide.

3. The process of claim 1 wherein the inorganic sulfide is sodium sulfide.

4. The process of claim 1 wherein the alkaline earth metal compound is calcium oxide.

5. The process of claim 1 wherein the inorganic sulfide is sodium sulfide and the alkaline earth metal compound is calcium oxide.

6. The process of claim 5 wherein the ratio of the arsenite as represented by the amount of available arsenic trioxide to sodium sulfide to calcium oxide is approximately 8:.006–.012:.006–.012, respectively.

7. A process for the purification of an aqueous solution of sodium arsenite containing at least one impurity from the group consisting of compounds of the elements aluminum, antimony, bismuth, boron, cadmium, cobalt, copper, chromium, iron, lead, magnesium, manganese, molybdenum, nickel, thallium, selenium, silicon, silver, strontium, tellurium, tin, titanium, zinc and vanadium, comprising precipitating the impurities by adding to the solution an inorganic sulfide selected from the group consisting of sodium sulfide and sodium bisulfide, adding to the solution an alkaline earth metal compound selected from the group consisting of calcium hydroxide and calcium oxide, heating the reaction mixture to between 80° and 100° C. and separating the precipitated impurities from the arsenite solution.

8. The process of claim 7 wherein the alkali metal hydroxide is sodium hydroxide.

9. The process of claim 7 wherein the inorganic sulfide is sodium sulfide.

10. The process of claim 7 wherein the alkaline earth metal compound is calcium oxide.

11. The process of claim 7 wherein the inorganic sulfide is sodium sulfide and the alkaline earth metal compound is calcium oxide.

12. The process of claim 11 wherein the ratio of the arsenite as represented by the amount of available arsenic trioxide to sodium sulfide to calcium oxide is approximately 8:.006–.012:.006–.012, respectively.

References Cited

Mellor, "A Comprehensive Treatise on Inorganic and Theoretical Chemistry," vol. 9, Longmans, Green & Co., New York, 1929, pp. 116–120.

Moeller, "Qualitative Analysis," McGraw-Hill Book Co., Inc., New York, 1958, pp. 181–182.

HERBERT T. CARTER, Primary Examiner